2,866,760

COMPOSITIONS AND METHODS FOR TREATING PARTICULATE SOLIDS

Walter M. Haessler, Chatham, John A. Bishop, Madison, and Edgar Eugene Stauffer, Mendham, N. J., assignors to Baker Industries, Inc., a corporation of Delaware No Drawing. Application July 8, 1955
Serial No. 520,932

15 Claims. (Cl. 252—383)

This application is a continuation-in-part of our copending application, Serial No. 480,996, filed January 10, 1955, now abandoned.

This invention relates to an improved means for catalyzing the polymerization of silicone materials and to the treatment of solid substances of granular, powdered or crystalline nature to give them water-repellent characteristics, to reduce their hygroscopicity or tendency toward caking and thus enable them to retain free-flowing properties under a wide variety of conditions. The invention relates to methods for producing such results, to the polymerization compositions utilized for such purposes and to the products obtained.

Heretofore, in the polymerization of most silicone materials, it has been known that if permitted to stand long enough, the silicone material will undergo polymerization at room temperatures. However, the period of time necessary to complete the desired polymerization is often a matter of months, which is not feasible for commercial operations, particularly where the silicone is employed to render water-repellent and free-flowing materials which are hygroscopic or have a tendency to cake. In an attempt to overcome these difficulties it has been the practice of those skilled in the art to employ various catalysts, such as acids, bases, the oxidizing catalysts, such as the peroxides (benzoyl peroxide, etc.) and the "driers," including the metal octoates and naphthenates employed widely by the paint industry. While these catalysts employed by the prior art accelerate the rate of polymerization of the silicones, the time required at room temperatures is still longer than is desirable in commercial applications. Also, these catalysts often have an untoward effect upon the material to be coated with the silicone, particularly where the material is decomposed by the catalyst. Consequently, it is the practice in most commercial operations employing the prior art catalysts to use heat, often in the order of temperatures of 100°–300° C., to produce a satisfactory degree of polymerization within a few hours.

The disadvantages of these prior art practices are believed to be obvious. Some of the silicones are somewhat unstable in the presence of heat and undergo decomposition and unwanted darkening. In other cases it is not feasible to employ heat, as the material to be treated with the silicone may not be stable in the presence of heat. We have discovered that certain catalysts in accordance with the present invention are particularly active in catalyzing the polymerization of silicones under the conditions of our process and will provide polymerization of most silicones in a short time without requiring the application of heat.

It is an object of the present invention to provide a rapidly polymerizing silicone-containing composition which will polymerize smoothly within a short time without requiring the application of heat, acids, alkalies, peroxides or driers.

It is another object of the invention to provide a process for rapidly and smoothly polymerizing a silicone at room or atmospheric temperature without requiring the presence of acids, alkalies, peroxides or driers.

It is a further object of the invention to provide a process for rapidly treating solids, and particularly finely-divided solids, at room or atmospheric temperature to make them water repellent, to reduce their hygroscopicity and to give them more permanent free-flowing properties.

It is an additional object of the invention to provide improved silicone treated products which may be rapidly prepared without the application of heat, whereby the rate of polymerization of the silicone may be easily controlled.

Other objects and advantages of the invention will be apparent to those skilled in the art from reading the description which follows:

We have discovered that various porous materials are excellent catalysts for the polymerization of the monomers and polymers of silicones when employed in accordance with the process of the present invention. The porous materials, and particularly the activated clays, when mixed with the silicone material to be polymerized, will rapidly polymerize the silicone material without the application of external heat in an easily controlled reaction.

The polymerization procedure of the invention is applicable to silicone monomers or polymers. When starting with lower polymers it is possible to form polymers of greater molecular weight. During the course of the polymerization the viscosity of the silicone material increases until the desired degree of polymerization is obtained. If desired, the porous catalyst may be removed from a liquid polymerized silicone by filtration. If the silicone has become too viscous for convenient filtration it may be first diluted with an inert diluent, such as toluene, etc., before filtering off the porous catalyst.

Our invention finds its most practical application in catalyzing the polymerization of a silicone to produce a moisture-repellent coating on the particles of a solid material which is hygroscopic and has a tendency to cake on storage. For example, in coating finely-divided materials, such as salt, starch, sugar and the like, which have a tendency to pick up moisture and lose their free-flowing properties, the employment of the porous material as a catalyst is particularly satisfactory. The porous materials are normally chemically-inert, non-toxic materials, and in the quantities employed do not impart any undesirable effects when used, even in coating foods. The polymerization of the silicone coating may be accomplished simply by thoroughly mixing as in a ball mill or by other conventional methods the material to be coated, the silicone material, and the porous catalyst. Care, of course, is to be taken that the moisture content of the mix will fall within the range set forth hereinafter. During the course of the polymerization both the particles of the material being rendered moisture-repellent and the porous material employed as a catalyst become coated with polymerized silicone material. The employment of the porous catalysts has been found to unexpectedly enhance the free-flowing characteristics of the coated mixture. During the treatment the material being rendered moisture-repellent or free-flowing is not adversely affected by the silicone, but its solubility in water is not greatly reduced. Thus sugar coated with a silicone in accordance with the invention may be used in the normal manner.

In the case of coating particles of a solid material, we have discovered that moisture control during polymerization of the silicone by the porous catalyst is highly important if satisfactory results are to be obtained. In general, the moisture content of the polymerization mix should be not less than 0.05% and desirably not more than 1.5%. Preferably the moisture content of the mix shall constitute from about 0.1% to 1.0% of the entire mix, with best results obtained in most cases with a moisture content of about 0.3%. The desirable moisture content may be obtained by adding the requisite amount of water to one or more of the ingredients of the polymerization mix to impart the desirable total moisture content to the total composition. However, alternatively, the moisture content of the mixture may be adjusted by adding separately a measured amount of water at the time of mixing the ingredients. We prefer to introduce the moisture adsorbed on the porous material employed as a catalyst. In some cases the constituents of the polymerization mixture, such as the porous catalyst, may normally contain the desired correct amount of moisture.

It is important for satisfactory polymerization of the silicone coating materials at room temperature that the porous material employed as a catalyst be one having a porosity greater than 0.2 cc. per gram and a surface area of at least 100 square meters per gram, such as the porous materials hereinafter described. It is contemplated that the surface area of the porous material will be more than 100 square meters per gram when determined by the gas adsorption method (see S. J. Gregg, Journal of the Chemical Society, 1946, page 561) and employing benzene and carbon tetrachloride as the materials adsorbed. It is our intention in employing benzene and carbon tetrachloride as the materials adsorbed to exclude those porous materials having average pore diameters of less than five Angstroms. This class of catalyst produces much more rapid and smoother polymerization of the silicone than is normally obtained with the so-called "driers," such as the octoates and naphthenates, peroxides, acids and bases, which have previously been employed in the art as catalysts for the polymerization of the silicones.

These porous catalyst materials include the fibrous clays, which are hydrated magnesium aluminum silicates, such as attapulgite, which is sold under the trade-marks "Attaclay" and "Attasol," other porous clays, such as sold under the trade-mark "Filtrol," the fullers' earths, including "Florex" (Florida fuller's earth), and heat-activated bentonite. Other inorganic silicates may be employed, including Vansil and Microcel, which are porous calcium silicates, and also the porous magnesium silicates. All of these materials are characterized by being highly adsorptive and porous, which result in part from their large surface areas.

While it is preferred to use the porous fibrous clays and silicates listed hereinabove, other porous materials may be used, such as activated alumina, activated silica, activated silica-alumina mixtures, activated magnesia, activated silica-magnesia mixtures, zeolite and activated carbon. These porous materials are satisfactory when they have a porosity and surface area as defined hereinabove.

Some of the porous clays contain large percentages of available or unbound, non-constituent moisture. If such a clay is employed, it should be dried so that the total available moisture content of the mixture shall not exceed the desired amount. For our purposes "available" moisture is that which is not chemically bound to and which does not form a part of the chemical structure of the clay itself. It may be defined as that moisture which may be driven from the porous clay by heating it at a temperature of about 100° C. for a time sufficient to insure no further loss of weight.

The porous materials employed at a catalyst may vary in particle size, depending upon the specific nature of the material used. In general, satisfactory results can be obtained with a particle size of from about 40 to 400 mesh U. S. Standard screen size, or even finer sizes, while best results are obtained with a particle size which is such that about 85% by weight will pass through a 325-mesh U. S. Standard screen.

When employed in rendering a solid non-hygroscopic we desire to incorporate the silicone ingredient in a concentration of from about 0.1% to about 3.0%, and preferably from about 0.25% to about 1.5% of the total powder composition. For uniformly consistent results, we desire to employ a minimum of about 0.5% of the silicone ingredient and for preferred results we desire to employ about 0.75%.

If an excess of moisture is used the treated material will have an excess of unreacted moisture. If insufficient moisture is used, the polymerization of the silicone will not proceed to a satisfactory degree. Now if an excess of silicone is used, the material may become tacky and have poor flow qualities. If insufficient silicone is used, the coating may not be sufficiently water-repellent. Since different silicones have different molecular weights, different amounts of water may be used for satisfactory results. Thus the limits of moisture and silicone set out herein are intended to teach the generally practical quantities to be used but, of course, may be deviated from in some cases.

We desire to employ the activated porous catalyst material having the required porosity and surface area in an amount of from about 0.5% up to about 50% by weight of the total powder composition. However, it is better not to exceed about 15% by weight of the total composition and it is usually advantageous to use only a few percent, such as about 5%, by weight of the total composition.

It is contemplated that the remainder of our preferred silicone coated composition, and desirably between about 76% and 99.5%, shall comprise a finely-divided material which is coated with the silicone.

In accordance with one preferred embodiment of the present invention we contemplate a powder composition containing from about 88% to 98%, and advantageously about 92%, of a finely-divided material which normally has a tendency to lump when exposed to the air. The powder composition shall desirably contain from about 0.5% to 1%, and preferably 0.75%, of a silicone ingredient. The activated porous catalyst component shall desirably constitute from about 1.5% to 11.5%, and preferably 5% of the total composition.

The silicones which may be polymerized by the catalysts of the present invention are the silanes and the polysiloxanes which undergo further polymerization. A polysiloxane may be defined for the purposes of this specification as a compound containing the elements silicon and oxygen and organic radicals, including alkyl, aryl and aralkyl radicals, the silicon being present in sufficient amount to affect the properties measurably. Where the silicone is employed to coat a finely-divided material it is desirably one which may polymerize to form a crosslinked polysiloxane. For other applications such as the production of higher polymers, the polymerized polysiloxane formed may not be crosslinked.

Where the silicone to be polymerized is not employed in coating a finely-divided solid material, difunctional silanes may be used as the silicone to be polymerized. Examples of such difunctional silicones are the dialkoxysilanes, the dihalosilanes and the silanediols, including dimethyldiethoxysilane, dimethyldichlorosilane, diphenyldichlorosilane and diphenylsilanediol, or mixtures thereof.

Where the silicone is to be employed in coating finely-divided solid material, it is desirable to use a starting material which is a trifunctional silicone, which is therefore capable of becoming crosslinked when it polymerizes on the finely-divided solid material.

The silicone ingredients or silicone materials which may be employed for coating finely-divided solid materials according to the present invention include organosilicones and are preferably those that may be admixed in liquid form with the particles of the finely-divided material to be rendered water repellent and the porous catalyst. Gaseous silicone materials capable of forming crosslinked polysiloxane coatings can also be used but are more troublesome to apply. However, any suitable starting material may be used which will produce the desired polysiloxane coating. Of themselves, such materials are known and are not a part of this invention. Many of them are now commercially available, and others, while known, are not yet commercially available. Examples of some of the suitable commercial materials for forming such coatings and which are now on the market are given later.

The polysiloxane materials which may be polymerized to a higher polymer or to produce a coating which forms on the finely-divided material to be rendered water repellent and on the porous catalyst shall desirably have the following general formula:

$$(R_xSi_yO_z)_n$$

wherein

R = a hydrocarbon group linked to a silicon with a single valence bond.
Si = silicon.
O = oxygen.
y = a whole number representing the number of silicon atoms in a repeating structural unit of the polysiloxane resin, and similarly.
x and z = the number of R groups and oxygen atoms, respectively.
n = the number of structural units in the surface formed by the polysiloxane.

Among the silicone materials which have been found to be satisfactory in obtaining a product according to the above formula are those which may be divided into the following three general groups:

Group I = silicone materials having the general composition expressed by the formula:

$$RSiX_3$$

Group II = silicone material mixtures having the general composition represented by the following formula:

$$aRSiX_3 + bR_2SiX_2$$

Group III = silicone materials having the general composition expressed by the empirical formula:

$$R_xSi_yO_yX$$

wherein

R = a hydrocarbon as described above. It may be aliphatic (such as alkyl groups including methyl, ethyl, amyl, octadecyl, cyclohexyl, etc., and alkenyl groups including vinyl and allyl) or aromatic (as phenyl, tolyl, etc.) or aralkyl (such as benzyl, etc.). In the simplest case it may be hydrogen.
X = a reactive group, as hydrogen, halogen, alkoxyl, hydroxyl, etc.
H = hydrogen.
O = oxygen.
Si = silicon.
a, b, x and y are whole numbers.

The silicone composition groups listed above have in common the fact that they represent different aspects of a class of materials which can be defined as being able to react to form a crosslinked polysiloxane of the general formula:

$$(R_xSi_yO_z)_n$$

where the limiting values of the ratio $x/z$ are less than 2 and not less than 2/3.

As the value of the ratio $x/z$ approaches 2/3 the polymer becomes more and more rigid, while as the ratio approaches 2, the polymer becomes more and more fluid until upon reaching a value of 2 a completely linear polymer with no crosslinking is produced.

More specifically, starting, for example, with compositions according to group I, the resulting polysiloxanes are generally believed to be produced by the following chemical reaction:

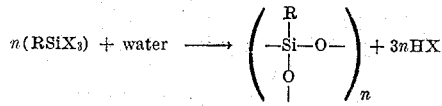

where $n$ must be an even number. If $n$ is an odd number, the end product will have an R immediately adjacent same.

Polysiloxanes obtained from group II compositions are generally believed to be produced by the following reaction:

Where $a=n$ and $b=n$;

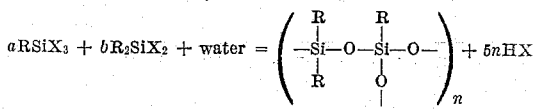

If $a=n$ and $b=2n$;

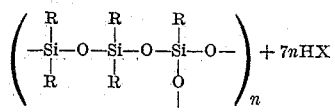

If $a=2n$ and $b=n$;

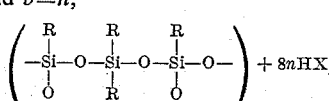

Polysiloxanes obtained from compositions of group III are generally believed to be produced by the following reaction:

$$nRSiOX + water \rightarrow$$

If $x=1$ and $y=1$;

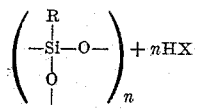

If $x=3$ and $y=2$;

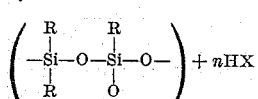

Regardless of whether or not the above theoretical formulae for the polymerization products formed of the silicones are correct in all respects, it is well known that starting materials of the types herein described may be reacted to form polymerized polysiloxane products, and we have found that coatings formed from such products are suitable for the purposes of this invention and that the polymerization of these materials may be catalyzed to take place in a matter of a few hours without requiring the application of heat by the catalysts of the present invention.

Among the polysiloxane-producing materials in accordance with group I above which may be employed are the alkyl trihalosilanes, including methyltrichlorosilane, amyltrichlorosilane, octadecyltrichlorosilane, cyclohexyltrichlorosilane, etc., alkenyl trihalosilanes, including allyltrichlorosilane, vinyltrichlorosilane, etc., the aryl trihalosilanes, including phenyltrichlorosilane, etc., the alkyl alkoxysilanes, including methyltriethoxysilane, mono-methyl-diethoxysilane, etc., and alkenyl alkoxysilanes, including vinyltriethoxysilane, etc. These starting materials are hydrocarbon substituted trifunctional silicone materials and include hydrocarbon substituted trihalosilane silicone materials.

Among the polysiloxane-producing materials in accordance with group II which may be employed are any of those mentioned in group I which are copolymerized by hydrolysis with difunctional silanes, such as dimethyldiethoxysilane, dimethyldichlorosilane and diphenyldihydroxysilane.

The starting materials according to group III are obtained from partial hydrolysis of compositions such as are listed in group I or II, such as are sold commercially by Dow-Corning as DC–1107, DC–1108, Decetex 104, and by Linde Air Products Co. as X–21, X–22, Y–1002, Y–1003. These starting materials are partially hydrolyzed methylhydrogen polysiloxanes, which are predominantly linear in nature but which upon further hydrolysis form crosslinked polysiloxanes. During the further hydrolysis, some of the hydrogen atoms which are attached to the silicon atoms are believed to be displaced and replaced with a crosslinking oxygen atom which connects the silicone atoms of two or more linear polysiloxane chains. Other commercially available materials include those produced by the General Electric Company. For example, General Electric SM–61 is an aqueous emulsion of which the active component is primarily dimethylpolysiloxane which becomes hydrolyzed and crosslinked when heated at about 95° C. General Electric SF–99 is a dimethylpolysiloxane material which is substantially linear in character possessing reactive hydroxyl groups. General Electric SC–87 is a partially hydrolyzed mixture of dimethyldichlorosilane and methyltrichlorosilane, with the former predominating.

The silane and polysiloxane forming materials listed in groups I, II and III described hereinabove have been successfully employed in place of the silicone materials described in the specific examples illustrated hereinbelow.

In order to evaluate the improved flow characteristics obtained with the novel coated finely-divided solid compositions of the present invention, a series of tests have been devised to establish standard properties which may be achieved by the coated compositions produced in accordance with this invention. Because of the distinctly superior flow characteristics of these novel compositions, it has been necessary to devise new standards. These tests have been defined as "pour" and "centrifuge" tests.

The first of these new tests is the "pour" test, which is used to determine the flow characteristics of the coated compositions. This is a standard ASTM test which has been applied previously to molding powder materials. The flow quality determined by the "pour" test is an important characteristic, inasmuch as the coated compositions may be dispensed through a small orifice or tube. A standard laboratory funnel can be used having a 60° wall with a top about 4 inches in diameter and with a stem of about 4 inches in length having an orifice opening of about ⅛ inch in diameter. The funnel is filled to its top with a sample of coated composition while the funnel stem is closed at its lower end. When the closure is removed from the lower end of the stem, the coated composition should flow of its own accord through the stem and out of the funnel if it is to be considered as passing the test. Obviously, the pour test as described above is applicable for testing finely divided materials only, and in the case of larger particles the test must be modified.

The "centrifuge" test is employed to determine the anti-packing characteristics of the coated compositions. This test is important as some of the coated compositions must be dispensed by pressure, force, or shaking. The test comprises filling a laboratory centrifuge tube having dimensions of about 25 millimeters in diameter and 100 millimeters in length, with a sample of the coated composition to be tested and rotating the centrifuge tube and its contents in a centrifuge at a speed of about 1600 revolutions per minute producing a compressive force on the coated compositions of approximately 500 times that of gravity. After about 1 minute of this centrifuging a satisfactory coated composition should fall out of this centrifuge tube without tapping the tube or other mechanical treatment when the tube is inverted.

In order more clearly to disclose the nature of the present invention, specific examples illustrating the present invention will hereinafter be described. It should be understood, however, that this is done solely by way of example and is intended neither to delineate the scope of the invention nor limit the ambit of the appended claims. In all cases the total moisture content of the mixture in each example did not exceed 1.5%.

*Example 1*

About 2828 parts by weight of finely-divided diammonium hydrogen phosphate were placed in a ball mill and to this were added 150 parts of attapulgite (having about 120 square meters surface area per gram, a porosity of 0.6 cc. per gram and containing about 1% moisture) and 22 parts of liquid Dow Corning DC 1107, described hereinabove, to produce a batch of 3000 parts. The material was thoroughly mixed in the ball mill at room temperature for a period of one hour. During the mixing period a considerable amount of hydrogen gas was evolved increasing the pressure within the mill. A sample of the resulting treated diammonium hydrogen phosphate and a sample of identical untreated diammonium hydrogen phosphate were compared for flow characteristics. The treated diammonium hydrogen phosphate flowed readily, while the untreated diammonium hydrogen phosphate did not flow. Other samples of the treated and untreated diammonium hydrogen phosphate were stored in open containers at room temperature for a period of one month. At the end of this time the treated diammonium hydrogen phosphate flowed well and passed each of the pour and centrifuge tests, while the untreated material did not.

*Example 2*

The procedure set forth in Example 1 was repeated substituting an equal quantity of finely-divided potato starch for the diammonium hydrogen phosphate and substituting an equal quantity of methyltriethoxysilane for the DC 1107. During the mixing, ethyl alcohol was evolved instead of hydrogen gas. Upon comparison with the untreated finely-divided potato starch, similar results to those described in Example 1 were obtained.

*Example 3*

The procedure set forth in Example 2 was repeated substituting an equal quantity of octadecyltrichlorosilane for the methyltriethoxysilane. During the mixing hydrogen chloride was evolved instead of ethyl alcohol. Upon comparison with untreated starch, similar results to those described in Example 2 were obtained.

*Example 4*

The procedure set forth in Example 1 was repeated substituting an equal quantity of activated alumina (having about 350 square meters surface area per gram and a porosity of 0.4 cc. per gram) for the attapulgite. Upon comparing the treated diammonium hydrogen phosphate with the untreated material, similar results to those described in Example 1 were obtained.

*Example 5*

The procedure set forth in Example 1 was repeated substituting an equal quantity of activated alumina (having about 350 square meters surface area per gram and a porosity of 0.4 cc. per gram) for the attapulgite and substituting an equal quantity of a 50–50 mixture of dimethyldiethoxysilane and phenyltrichlorosilane. During the mixing ethyl alcohol and hydrogen chloride were evolved instead of hydrogen. Upon comparing the treated diammonium hydrogen phosphate with the untreated material, similar results to those described in Example 1 were obtained.

Example 6

The procedure set forth in Example 2 was repeated substituting an equal quantity of activated alumina (having about 350 square meters surface area per gram) for the attapulgite. Upon comparison with the untreated potato starch, similar results to those described in Example 2 were obtained.

Example 7

The procedure set forth in Example 5 was repeated substituting an equal quantity of octadecyltrichlorosilane for the silicone mixture. During the mixing substantially only hydrogen chloride was evolved. Upon comparison with the untreated diammonium hydrogen phosphate, similar results to those described in Example 5 were obtained.

Example 8

The procedure set forth in Example 1 was repeated substituting an equal quantity of sodium chloride for the diammonium hydrogen phosphate. Upon comparison with the untreated sodium chloride, similar results to those described in Example 1 were obtained.

Example 9

The procedure set forth in Example 1 was repeated substituting an equal quantity of sodium bicarbonate for the diammonium hydrogen phosphate, an equal quantity of activated carbon (having about 1100 square meters of surface area per gram and a porosity of 0.9 cc. per gram) for the attapulgite, and an equal quantity of cyclohexyltrichlorosilane for the DC-1107. During the mixing hydrogen chloride was evolved in place of hydrogen gas. Upon comparison with the untreated sodium bicarbonate, similar results to those described in Example 1 were obtained.

Example 10

The procedure set forth in Example 9 was repeated substituting an equal quantity of Decetex 104, described hereinabove, for the cyclohexyltrichlorosilane. Hydrogen gas was evolved in place of the hydrogen chloride during mixing. Upon comparison with the untreated sodium bicarbonate, similar results to those described in Example 9 were obtained.

Example 11

The procedure set forth in Example 1 was repeated substituting an equal quantity of sugar for the diammonium hydrogen phosphate and substituting an equal quantity of a 50–50 mixture of dimethyldiethoxysilane and allyltrichlorosilane in place of the DC-1107. During the mixing, a mixture of ethyl alcohol and hydrogen chloride evolved instead of hydrogen gas. Upon comparison with the untreated sugar, similar results to those described in Example 1 were obtained.

Example 12

About 2903 parts of finely-divided sodium nitrate were placed in a ball mill and to this were added 75 parts of a silica-magnesia sold under the trademark "Magnesol" (having a surface area of about 515 square meters per gram) and 22 parts of phenyltrichlorosilane, to produce a batch of 3000 parts. The material was mixed in the ball mill for a period of one hour. During the mixing, hydrogen chloride gas was evolved. Upon comparison with the untreated sodium nitrate, similar results to those described in Example 1 were obtained.

Example 13

About 2903 parts of a finely-divided potato starch were placed in a ball mill and to this were added 75 parts of Microcel (having about 425 square meters surface area per gram) and 22 parts of cyclohexyltrichlorosilane to produce a batch of 3000 parts. The mixture was mixed in the ball mill for a period of one hour. During the mixing, hydrogen chloride gas was evolved. Upon comparison with the untreated potato starch, similar results to those described in Example 1 were obtained.

Example 14

About 2828 parts by weight of potassium chloride were placed in a ball mill and to this were added 150 parts of Florex (Florida fuller's earth) (having a surface area of about 124 square meters per gram) and 22 parts of vinyltriethoxysilane, to produce a batch of 3000 parts. The material was thoroughly mixed in the ball mill for a period of one hour. During the mixing, ethyl alcohol was evolved. Upon comparison with the untreated potassium chloride, similar results to those described in Example 1 were obtained.

Example 15

About 2835 parts of potassium bicarbonate were placed in a ball mill and to this were added 150 parts of Filtrol (activated bentonite) (having about 280 square meters of surface area per gram) and 15 parts of Linde X-22 described hereinabove, to produce a batch of 3000 parts. The material was mixed in the ball mill for a period of one hour. During the mixing, hydrogen gas was evolved. Upon comparison with the untreated potassium bicarbonate, similar results to those described in Example 1 were obtained.

Example 16

About 2835 parts of sodium carbonate were placed in a ball mill and to this were added about 150 parts of activated magnesia (Seasorb) (having a surface area of about 140 square meters per gram) and 15 parts of vinyltriethoxysilane to produce a batch of 3000 parts. The material was mixed in the ball mill for a period of one hour. During the mixing ethyl alcohol was evolved. Upon comparison with the untreated sodium carbonate, similar results to those described in Example 1 were obtained.

Example 17

About 2903 parts of ammonium dichromate were placed in a ball mill and to this were added 75 parts of silica gel (having about 800 square meters surface area per gram) and 22 parts of G. E. SC-87, described hereinabove, to produce a batch of 3000 parts. The material was mixed in the ball mill for a period of one hour. During the mixing hydrogen chloride gas was evolved. Upon comparison with the untreated ammonium dichromate similar results to those described in Example 1 were obtained.

Example 18

About 2835 parts of urea were placed in a ball mill and to this were added 150 parts of a silica-alumina mixture (having a surface area of about 500 square meters per gram) and 15 parts of cyclohexyltrichlorosilane, to produce a batch of 3000 parts. The material was mixed in the ball mill for a period of about one hour at room temperature. During the mixing hydrogen chloride was evolved. Upon comparison with the untreated urea, similar results to those described in Example 1 were obtained.

Example 19

About 2903 parts of sodium chloride were placed in a ball mill and to this were added 75 parts of activated halloysite (Filtrol) (having a surface area of about 140 square meters per gram) and 22 parts of allyltrichlorosilane, to produce a batch of 3000 parts. The material was mixed in the ball mill for a period of one hour. During the mixing hydrogen chloride gas was evolved. Upon comparison with the untreated sodium chloride, similar results to those described in Example 1 were obtained.

Example 20

About 2835 parts of potassium nitrate were placed in a ball mill and to this were added 150 parts of attapulgite and 15 parts of Decetex 104, described hereinabove, to produce a batch of 3000 parts. The material was mixed in the ball mill for a period of one hour. During the mixing hydrogen gas was evolved. Upon comparison with the untreated potassium nitrate, similar results to those described in Example 1 were obtained.

It will be apparent to those skilled in the art that equivalent materials may be used in place of those employed in the foregoing examples. For example, in the foregoing specific examples, the silicone materials employed have been replaced by the polysiloxane producing materials described in groups I, II and III hereinabove with satisfactory results.

In the foregoing examples and elsewhere in this specification, percentages and parts are intended to be expressed in terms of weight.

We believe that remarkably advantageous results are unexpectedly obtained from the coated compositions of the present invention in that the flow qualities of the composition are improved over the flow qualities which would result if each of the components were treated separately. Our belief is borne out by certain experiments which we have conducted in accordance with a teaching in the book by J. J. Hermans, "Flow Properties of Disperse Systems," page 405 et seq., published by Interscience Publishers, Inc. (1953). In this series of experiments, the angle of repose of each of the finely-divided materials to be coated was determined, then that of mixtures of the finely-divided material plus a porous catalyst and then the finely-divided material with a polysiloxane coating but no porous catalyst. When compared to the angle of repose of the finished product of the present invention consisting of a finely-divided material mixed with a porous catalyst and a polysiloxane coating, the product produced in accordance with the invention was found to be far superior in its flowability over any of the other three as measured by the above-identified Hermans' test. In fact, the test results show that the contribution to the flow properties of each of the components of the product of the invention are not additive, but much greater than would have been predicted from the data obtained with each of the components.

While the present invention finds its greatest application in coating finely divided solid materials, it also provides an excellent means for polymerizing the silicones themselves from monomers and lower polymers to higher polymers. This is illustrated by Examples 21 and 22 which follow:

*Example 21*

About 890 parts of dimethyldiethoxysilane and 100 parts of attapulgite (having about 120 square meters surface area per gram and a porosity of 0.6 cc. per gram and containing about 10% moisture) were placed in a beaker and stirred intermittently to keep the attapulgite suspended in the silicone over a period of six hours. At the end of six hours the silicone had increased perceptibly in viscosity indicating that substantial polymerization had taken place. The increase in viscosity obtained in this example during a period of six hours was comparable to that obtained under otherwise identical conditions over a period of 24 to 48 hours employing zinc octoate in place of attapulgite as the catalyst.

*Example 22*

About 850 parts of octadecyltrichlorosilane and 150 parts of attapulgite (having about 120 square meters surface area per gram and a porosity of 0.6 cc. per gram and containing about 5% moisture) were placed in a beaker and stirred continuously to keep the attapulgite suspended in the silicone over a period of one hour. At the end of one hour the silicone had increased perceptibly in viscosity indicating that substantial polymerization had taken place. The increased viscosity obtained in this example over a period of one hour was two to three times that obtained for the same time under identical conditions employing zinc octoate in place of attapulgite as the catalyst.

While the invention has been described with reference to specific embodiments thereof, it will be understood that other embodiments may be resorted to without departing from the invention. Therefore, the form of the invention set out above should be considered as illustrative and not as limiting the scope of the following claims.

What is claimed is:

1. A free-flowing, finely-divided, solid composition comprising a finely-divided, solid material normally susceptible to caking, a porous material having a surface area in excess of 100 square meters per gram, said porous material being selected from the group consisting of attapulgite, halloysite, fuller's earth, bentonite, activated alumina, activated silica, activated silica-alumina mixtures, activated magnesia, calcium silicates, magnesium silicates, and activated carbon, and a polysiloxane coating on both materials, the polymerization of the polysiloxane coating having been catalyzed by the porous material.

2. A free-flowing, finely-divided, solid composition as defined in claim 1, wherein the porous material is a clay.

3. A free-flowing, finely-divided, solid composition as defined in claim 1, wherein the porous material constitutes from about 0.5% to 50% of the composition and the polysiloxane coating about 0.1% to 3.0%.

4. A free-flowing, finely-divided, solid composition as defined in claim 1, wherein the finely-divided, solid material susceptible to caking is finely-divided starch.

5. A free-flowing, finely-divided, solid composition as defined in claim 1, wherein the finely-divided, solid material susceptible to caking is a water-soluble material.

6. A free-flowing, finely-divided, solid composition as defined in claim 1, wherein the finely-divided, solid material susceptible to caking is diammonium hydrogen phosphate.

7. A free-flowing, finely-divided powder as defined in claim 1, wherein the finely-divided powder, susceptible to caking, is sodium bicarbonate.

8. A free-flowing, finely-divided, solid composition as defined in claim 1, wherein the polysiloxane coating is produced by polymerizing a partially hydrolyzed methyl hydrogen polysiloxane.

9. A novel method for polymerizing a polymerizable silicone material rapidly and smoothly and without requiring the application of heat, which method comprises mixing water, a polymerizable silicone material, and a catalyst the catalyst being a porous material having a surface area of at least 100 square meters per gram.

10. A novel method as defined by claim 9, wherein the polymerizable silicone material is a hydrocarbon-substituted siloxane.

11. A novel method for polymerizing a polymerizable silicone material rapidly and smoothly and without requiring the application of heat, which method comprises mixing, in the presence of moisture, the polymerizable silicone material with a catalyst comprising a porous material having a surface area of at least 100 square meters per gram.

12. A novel method as defined by claim 9, wherein the porous material is a clay.

13. A method of treating a finely-divided, solid material normally susceptible to caking, to render free-flowing characteristics to the material which are retained even after varying conditions of storage for substantial periods of time, which comprises mixing the finely-divided, solid material with a polymerizable silicone material and a porous material having a surface area in excess of 100 square meters per gram, the porous material catalyzing the polymerization of the polymerizable silicone material.

14. A method as defined in claim 13, wherein there is present enough moisture to comprise 0.05% to 1.5% of the resulting mixture.

15. A novel method as defined by claim 13, wherein the powdered material constitutes from about 0.5% to 50% of the total composition and the polymerizable silicone about 0.1% to 3%.

References Cited in the file of this patent

UNITED STATES PATENTS

| | | |
|---|---|---|
| 2,371,068 | Rochow | Mar. 6, 1945 |
| 2,460,805 | Britton et al. | Feb. 8, 1949 |
| 2,618,615 | Connolly | Nov. 18, 1952 |
| 2,635,084 | Chevalier | Apr. 14, 1953 |
| 2,647,892 | LaBrie et al. | Aug. 14, 1954 |
| 2,689,166 | Rust et al. | Sept. 14, 1954 |
| 2,744,923 | Duane | May 8, 1956 |

OTHER REFERENCES

"Chemistry of the Silicones," Rochow (1946), page 87.